US012742635B2

(12) United States Patent
Martin et al.

(10) Patent No.: US 12,742,635 B2
(45) Date of Patent: Sep. 22, 2026

(54) LAYER THICKNESS DETERMINATION BY FOUR-WAVE-MIXING SPECTROSCOPY

(71) Applicant: Monstr Sense Technologies, LLC, Ann Arbor, MI (US)

(72) Inventors: Eric W. Martin, Saline, MI (US); Torben L. Purz, Nordhorn (DE); Steven T. Cundiff, Ann Arbor, MI (US)

(73) Assignee: MONSTR SENSE TECHNOLOGIES, LLC, Ann Arbor, MI (US)

( * ) Notice: Subject to any disclaimer, the term of this patent is extended or adjusted under 35 U.S.C. 154(b) by 73 days.

(21) Appl. No.: 18/909,189

(22) Filed: Oct. 8, 2024

(65) Prior Publication Data

US 2025/0116505 A1 Apr. 10, 2025

Related U.S. Application Data

(60) Provisional application No. 63/543,088, filed on Oct. 8, 2023.

(51) Int. Cl.
*G01B 11/06* (2006.01)
*G01J 3/433* (2006.01)

(52) U.S. Cl.
CPC ............ *G01B 11/06* (2013.01); *G01J 3/4338* (2013.01)

(58) Field of Classification Search
CPC ............................... G01B 11/06; G01J 3/4338
See application file for complete search history.

(56) References Cited

U.S. PATENT DOCUMENTS 5,812,261 A * 9/1998 Nelson ................. G01N 29/449 356/600
6,016,202 A * 1/2000 Fuchs ................... G01B 11/06 356/451
6,118,533 A * 9/2000 Banet ..................... G01N 21/17 356/450
7,609,731 B2 * 10/2009 Dantus ............... G01N 21/4795 372/9
2003/0058449 A1 * 3/2003 Banet ................. G01B 11/0666 356/432
2005/0009081 A1 * 1/2005 McFarland .......... B01J 19/0046 435/7.1
2011/0075150 A1 * 3/2011 Mercer ................ G01N 21/255 356/450
2015/0116721 A1 * 4/2015 Kats ...................... H10F 77/315 359/887

FOREIGN PATENT DOCUMENTS

CN 108971747 A * 12/2018 ............. B23K 26/00
RU 2359220 C1 * 6/2009 ............. G01B 11/06
WO 2022226039 A1 10/2022

OTHER PUBLICATIONS

Tonndorf, P. et al., in Optics Express vol. 21, No. 4, pp. 4908-4916, Feb. 20, 2013.

* cited by examiner

*Primary Examiner* — Michael P LaPage

(74) *Attorney, Agent, or Firm* — Michael McCandlish, Esq.; Mindful IP PLLC

(57) ABSTRACT

A method determines the number of layers in a sample material. The method includes measuring, as a function of two or more wavelengths, a four-wave mixing (FWM) spectrum of the sample material. The method further includes using the FWM spectrum to determine a thickness of the sample material, wherein the thickness is a number of layers in the sample material.

17 Claims, 6 Drawing Sheets

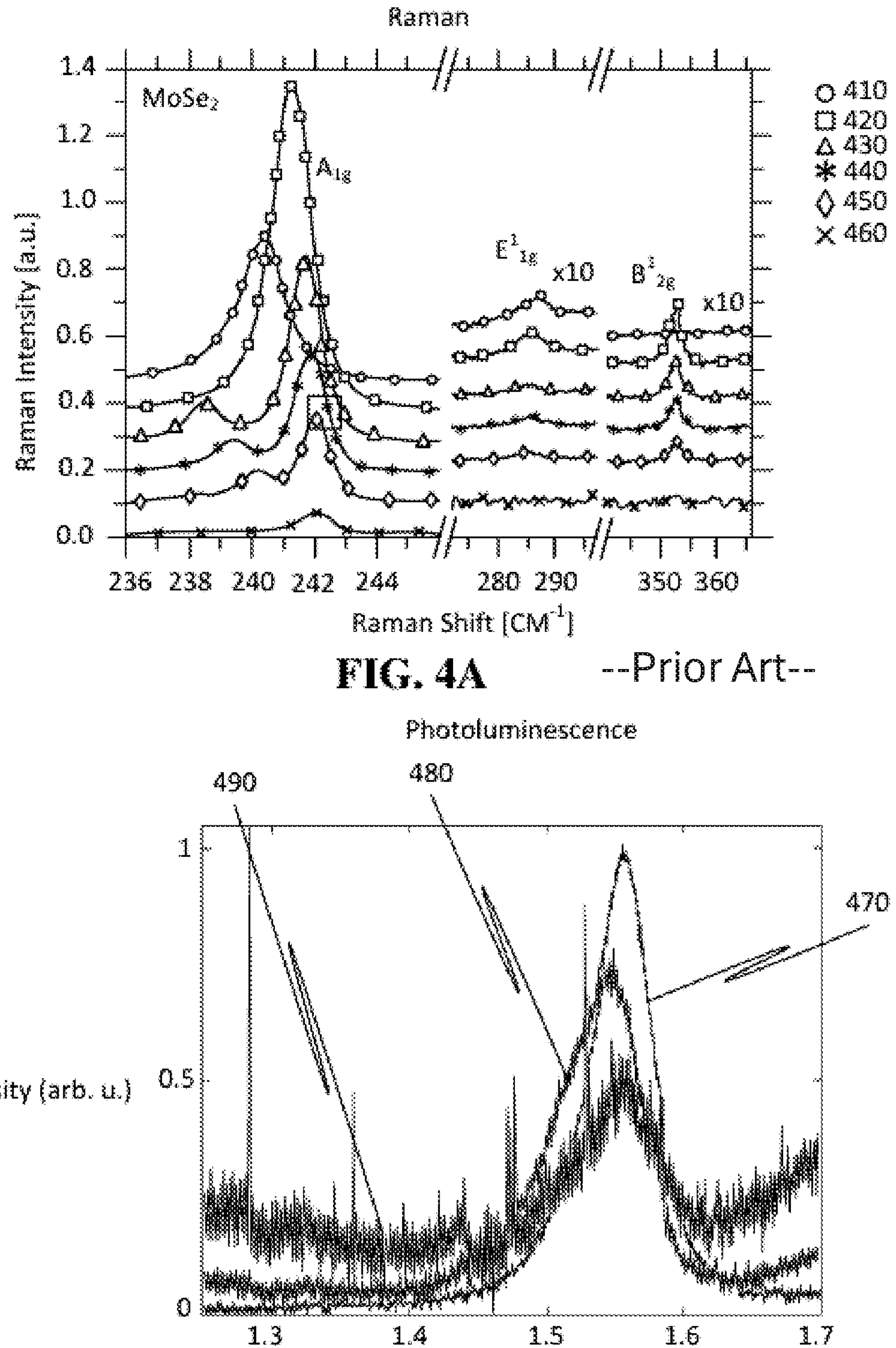
FIG. 4A --Prior Art--
FIG. 4B --Prior Art--

LAYER THICKNESS DETERMINATION BY FOUR-WAVE-MIXING SPECTROSCOPY

CROSS-REFERENCE TO RELATED APPLICATION

The present patent application claims priority to U.S. provisional patent application 63/543,088 filed on Oct. 8, 2023, the subject matter of which is incorporated herein by reference in its entirety.

GOVERNMENT LICENSE RIGHTS

This invention was made with Government support under grant number 2208201 awarded by the National Science Foundation. The Government has certain rights to this invention.

BACKGROUND

Certain materials have novel properties that exist only when the materials are thinned down to a few atoms thick. Graphene is a monolayer film of graphite with high conductivity and tensile strength. Transition metal dichalcogenides (TMDs), such as $MoS_2$ and $WSe_2$, interact strongly with light when thinned to a single or few monolayers making them great candidates for display and solar technology. One of the challenges in scaling production of these materials is that the metrology tools for measuring the thickness of these monolayer films are not sufficient.

Precise measurements of thin material layers are important for monitoring the growth process and quality control. For monitoring growth processes, in particular, it is best to use an optical tool with a low numerical aperture. This is because uniform growth of a material requires that the monitor port not take up a large surface area in most typical growth techniques including metal-organic chemical vapor deposition (MOCVD), chemical vapor deposition (CVD), and molecular beam epitaxy (MBE).

Using spectral interferometry or ellipsometry it is possible to measure thin films with thicknesses down to nanometers. However, these tools are not sufficient to measure a monolayer film that is less than 4 nm thick.

The current state of the art for monolayers is to measure and validate monolayer thickness using either atomic force microscopy (AFM) or Raman spectroscopy. However, both of these methods are slow and incompatible with monitoring the growth of materials. AFM requires a probe that sits right on the surface of the material, which would occlude the surface from the deposition. Spontaneous Raman is a light-matter interaction in which light scattered off a material is shifted in energy by a vibration mode of the material, called a Raman mode. Because the energies of these Raman modes depend on the number of layers in the material, high-resolution spectroscopy of this optical process can be used to determine layer thickness. Unfortunately, Raman scattering is an inefficient process, and the Raman-shifted photons are emitted in every direction. Therefore, Raman spectroscopy requires either a high numerical aperture or a long, more than 30 seconds, integration time.

Though they are currently not used in metrology tools, the frequencies of electronic resonances in few-layer materials also depend on the layer thickness. In TMDs, for instance, the exciton resonance has been reported to shift more than 2 THz as the layer number increases from 1 to 2, 3, 4, etc. These energy shifts are typically measured with photoluminescence (PL), a standard spectroscopic technique. However, PL cannot be used for growth monitoring. In the few-layer materials with monolayers that emit PL, the PL emission is strongly quenched as the layer number increases. This means that at an interim growth level, such as partial growth of a second layer, the measured spectrum will not be shifted because the monolayer contribution has a substantially higher spectral weight. The energy shift is only measurable once the next layer is completely deposited. Linear absorption spectroscopy can also measure the resonance energy. However, the linear absorption by monolayer samples is weak.

SUMMARY

A laser is used to induce a nonlinear response from a material with an electronic resonance. The nonlinear response described here is a four-wave mixing (FWM) signal, caused by the absorption of photons near the spectral feature. There are several physical processes that contribute to an FWM signal including many-body effects, stimulated Raman scattering, and non-resonant FWM. The nonlinear response of the material is enhanced by an electronic resonance. Therefore, the spectrum, or energy dependence, of an FWM signal often resembles the linear absorption signal of a material. Using the four-wave mixing spectrum, a thickness of the sample material can be determined. Thickness, as used herein, is a number of layers of a material. Thickness can be expressed in integers, i.e., 1, 2, 3, etc., and can also include intermediate (fractional) values, e.g., 2.5. Layer, as used herein, is a single atomic layer for a single atomic layer material, or a single sheet for materials such as TMDs or other compound layered materials.

In an example, the techniques described herein relate to a method for determining a number of layers in a sample material including: Measuring, as a function of two or more wavelengths, a four-wave mixing (FWM) spectrum of the sample material; and using the FWM spectrum to determine a thickness of the sample material, wherein the thickness is a number of layers in the sample material.

In some aspects, the techniques described herein relate to a method, wherein the thickness determination is made by determining ratios of the FWM spectrum at different wavelengths.

In some aspects, the techniques described herein relate to a method, wherein the thickness determination includes comparing the four-wave mixing spectrum of a sample material with an unknown thickness to FWM spectrum of samples made of a same material with known thicknesses.

In some aspects, the techniques described herein relate to a method, wherein the known thicknesses are an integer number of layers of the material.

In some aspects, the techniques described herein relate to a method, wherein the thickness determination includes calculating a spectral peak of the four-wave mixing spectrum.

In some aspects, the techniques described herein relate to a method, wherein the FWM spectrum is induced by two excitation beams, the excitation beams are each amplitude modulated with two different frequencies (f1 and f2), and the FWM spectrum is measured on a detector by lock-in detection at a difference (f1−f2) or a sum (f1+f2) frequency of each of the two excitation beams.

In some aspects, the techniques described herein relate to a method, wherein the layers of the sample material are a transition metal dichalcogenide.

In some aspects, the techniques described herein relate to a method, wherein the transition metal dichalcogenide is $MoS_2$ or $WSe_2$.

In another example, the techniques described herein relate to a system, including: an optical spectroscopy system configured to perform four-wave mixing spectroscopy, and a computer, the computer including a processor programmed to: measure, via nonlinear optical spectroscopy, a FWM spectrum of a sample material as a function of two or more wavelengths; use the FWM spectrum to determine a thickness of the sample material, wherein the thickness is a number of layers in the sample material.

In some aspects, the techniques described herein relate to a system, wherein the thickness determination is made by determining ratios of the FWM spectrum at different wavelengths.

In some aspects, the techniques described herein relate to a system, wherein the thickness determination includes comparing the FWM spectrum of a sample material with an unknown thickness to FWM spectrum of samples made of a same material with known thicknesses.

In some aspects, the techniques described herein relate to a system, wherein the known thicknesses are an integer number of layers of atoms.

In some aspects, the techniques described herein relate to a system, wherein the thickness determination is made by calculating a spectral peak of four-wave mixing spectrum.

In some aspects, the techniques described herein relate to a system, wherein the FWM spectrum is induced by two excitation beams, the excitation beams are each amplitude modulated with two different frequencies (f1 and f2), the FWM spectrum is measured on a photodetector by lock-in detection at a difference (f1−f2) or a sum (f1+f2) frequency, of each of the two excitation beams.

In some aspects, the techniques described herein relate to a system, wherein the layers of the sample material are a transition metal dichalcogenide.

In some aspects, the techniques described herein relate to a system, wherein the transition metal dichalcogenide is $MoS_2$ or $WSe_2$.

A device may Measuring, as a function of two or more wavelengths, a four-wave mixing (FWM) spectrum of the sample material. A device may use the FWM spectrum to determine a thickness of the sample material, wherein the thickness is a number of layers in the sample material. A device may Measuring, as a function of two or more wavelengths, a four-wave mixing (FWM) spectrum of the sample material. A device may use the FWM spectrum to determine a thickness of the sample material, wherein the thickness is a number of layers in the sample material.

BRIEF DESCRIPTION OF THE DRAWINGS

FIG. 4A shows an example of a Raman intensity diagram for $MoSe_2$ sample material.

FIG. 4B shows an example of a PL intensity diagram for $MoSe_2$ sample material.

DETAILED DESCRIPTION

To perform FWM spectroscopy of a sample, the FWM response of the sample of interest is measured at multiple wavelengths. The data set of FWM responses as a function of multiple wavelengths is a FWM spectrum. The multiple wavelength responses comprising the FWM spectrum can be measured using a light source that excites multiple wavelengths at once and spectrally filtering the signal after using a spectrometer or interference filters. Alternatively, the light source wavelength can be tuned to each wavelength and the response measured as a function of that tuning.

Methods and apparatuses for measuring FWM responses of the sample of interest are known. For example, international patent application PCT/US2022/025503, filed on Apr. 20, 2022, the subject matter of which is fully incorporated by reference into the subject matter of this patent application, discloses such a method and apparatus for measuring FWM responses on the sample of interest.

Figure 1:
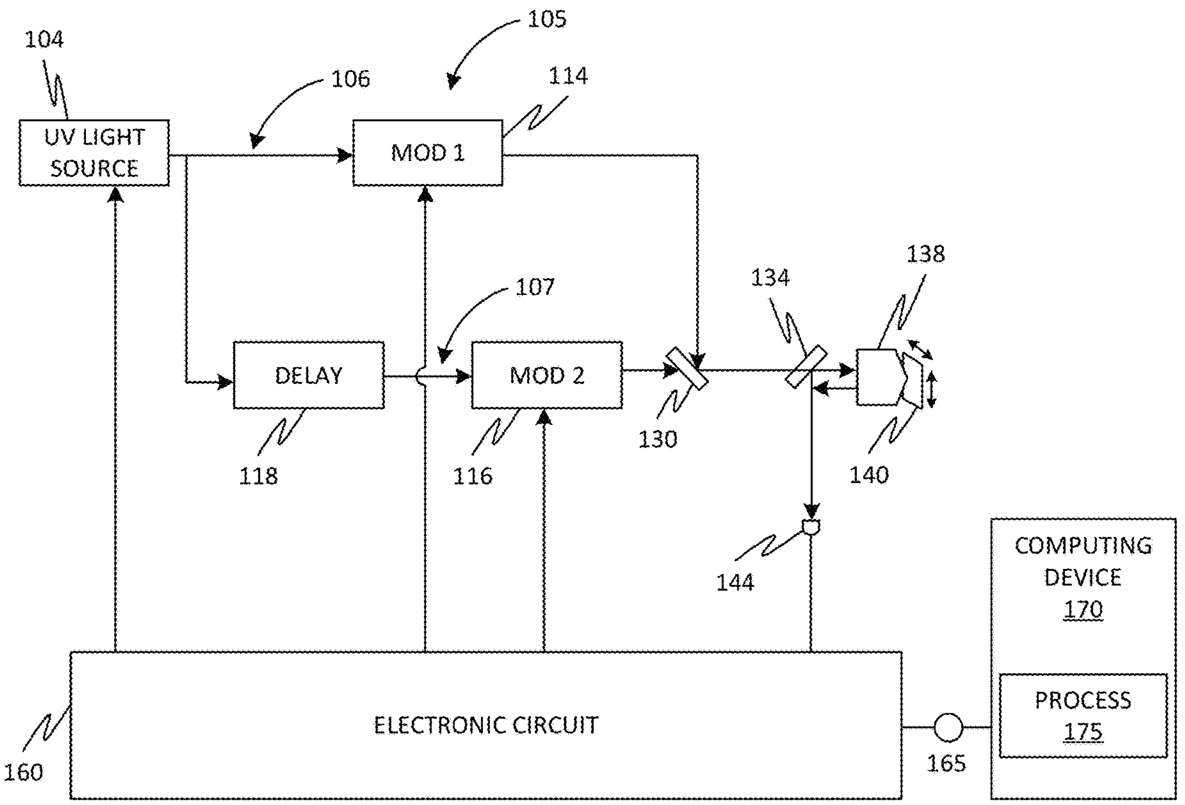
FIG. 1 is a diagram of an example spectroscopy system for detecting characteristics of a sample material using Four-Wave mixing (FWM).

FIG. 1 illustrates an example FWM spectroscopy system 100 for measuring a FWM spectrum of a sample material 140. The system employs advanced optical and electronic techniques to evaluate characteristics of the sample material 140 through nonlinear optical processes four-wave mixing (FWM), using a combination of modulated laser beams and signal detection methods.

A laser light source 104 produces a coherent beam of light. This light is directed through two optical paths: a pump optical path 106 and a probe optical path 107. Together, the pump optical path 106 and the probe optical path 107 form part of an interferometer 105, which is used to generate two distinct beams, referred to as the pump beam and the probe beam. The purpose of these beams is to interact with the sample material 140 to induce and measure nonlinear optical responses.

The light from the light source 104 is initially modulated by two modulators 114, 116 (MOD 1, MOD 2), located respectively in the pump and probe optical paths 106, 107. These modulators apply specific RF frequencies, for example f1, f2, to the light beams to create controlled modulations, enabling the system to separate the signals of interest from background noise and unwanted responses.

A delay element 118 is placed in the probe optical path 107 to allow for temporal adjustments between the pump and probe beams. By introducing a controlled delay, the system 100 can adjust the timing of the probe beam relative to the pump beam to capture time-resolved data about the material 140.

The modulated pump and probe beams are then combined collinearly by a beam splitter 130, meaning they are spatially overlapped and propagated in the same direction. This combined beam, now referred to as the excitation beam, is directed toward the sample material 140 via a focusing lens 138. As the excitation beam interacts with the sample material 140, it generates both linear and nonlinear optical responses. The nonlinear response is of particular interest as it can reveal detailed information about the material's electronic structure, defects, and other properties.

A second beam splitter 134 is used to separate the response from the sample material 140 into a detection path. The resulting response beams, including a nonlinear response and a linear response, are directed to a photodetector 144. The photodetector 144 converts the optical response into an electrical signal that can be processed and analyzed by an electronic circuit 160.

The electronic circuit 160 includes several subsystems, such as control electronics, RF (radio frequency) generation electronics, and signal processing electronics. These subsystems work together to generate electrical signals for modulating the light beams, processing the signals from the photodetector, and extracting information of interest.

The RF generation electronics of the electronic circuit 160 may generate electrical signals that drive the modulators 114, 116. These signals include multiple frequency components that are used to modulate the light beams in the pump and probe optical paths. By applying different frequencies to the pump and probe beams, the system creates a modulated light source that can interact with the sample material 140 in a controlled manner. The modulated signals help to isolate the nonlinear optical response from the material, allowing for a more accurate and detailed measurement.

The signal processing electronics of the electronic circuit 160 may extract the signal of interest from the electrical signal produced by the photodetector 144, including filtering out noise and background signals to focus on the nonlinear response from the material 140. The extracted signal is then analyzed to determine characteristics of the material 140. The electronic circuit 160 includes one or more interface ports 165 for outputting the processed data to external devices, such as a computing device 170, e.g., to allow a user to control the system, process data, and visualize the results. The computing device 170 may include a processor 175 and a memory. The processor 175 may be programmed to execute a program stored in the memory, e.g., a programmed to process received data and determine one or more characteristics of the sample material 140.

In summary, the system 100 measures and analyzes nonlinear optical responses of the sample material 140. By using a combination of laser light, precise modulation techniques, and advanced signal processing, the system 100 provides detailed insights into the properties of the material 140. To determine an FWM spectrum, multiple wavelengths of the laser light source 104 are utilized. The multiple wavelengths can be generated using a light source 104 that excites multiple wavelengths at once and spectrally filtering the signal after using a spectrometer or interference filter, the light source wavelength can be tuned to each wavelength and the response measured as a function of that tuning.

With reference to FIG. 1, the thickness, i.e., a number of material layers in the sample material 140, can be determined by measuring a FWM spectrum of a resonantly excited FWM response of a thin sample material 140. The sample material 140 can be, e.g., a single-layer material (also known as a 2D material) such as graphene, a monolayer TMD, such as $MoS_2$ and $WSe_2$, and other materials that form crystalline layered structures in which the layers are bound by van der Waals forces.

The sample material 140 may be monolayer or multilayer including material such as graphene, hexagonal Boron Nitride, and/or transition metal dichalcogenides (TMDs), such as $MoS_2$ and $WSe_2$. Graphene is a single layer of carbon atoms arranged in a two-dimensional honeycomb lattice. Hexagonal Boron Nitride is an insulator that is often used in multilayer structures as a substrate or barrier. $MoSe_2$ (molybdenum diselenide) is a transition metal dichalcogenide (TMD) compound consisting of molybdenum (Mo) and selenium (Se). It is a layered material similar to graphene, with each layer being only a few atoms thick. $WSe_2$ (tungsten diselenide) is another transition metal dichalcogenide (TMD), similar to $MoSe_2$, composed of tungsten (W) and selenium (Se). It has a layered structure, with each layer consisting of a plane of tungsten atoms sandwiched between two planes of selenium atoms.

Figure 2:
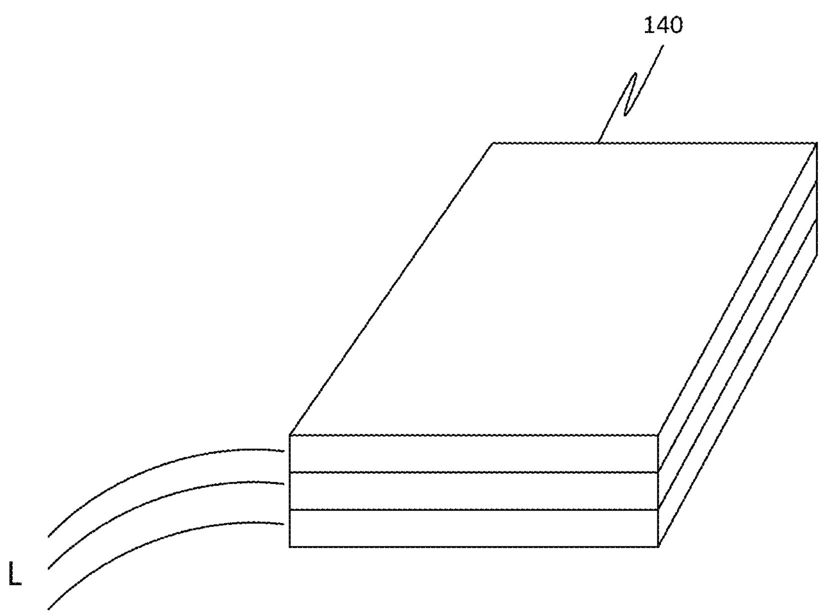
FIG. 2 shows an example material having multiple layers.

FIG. 2 is an example of a sample material 140 having layers L. The measured thickness T can specify an accumulated thickness of the sample material 140 expressed as the number of layers L.

To perform FWM spectroscopy of the sample material 140, the FWM response of the sample material 140 is measured at multiple wavelengths. For example, the FWM response is induced by two excitation beams, the excitation beams are each amplitude modulated with two different frequencies, f1, f2, as discussed above with respect to the pump and probe signals. The FWM response is measured based on data from the photodetector 144 by lock-in detection at a difference frequency f1−f2 or a sum frequency f1+f2.

Figure 3A:
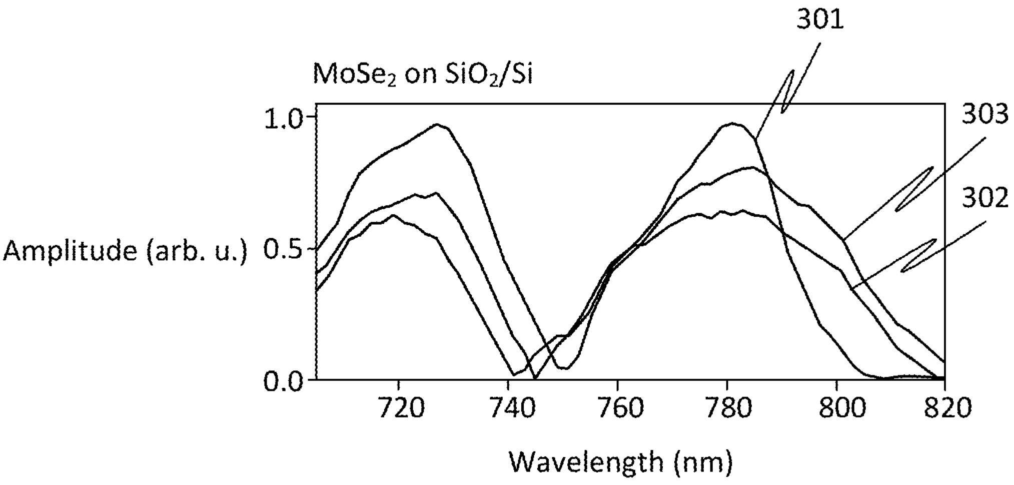
FIG. 3A shows example FWM calibration curves for MoSe2 on SiO2.
Figure 3B:
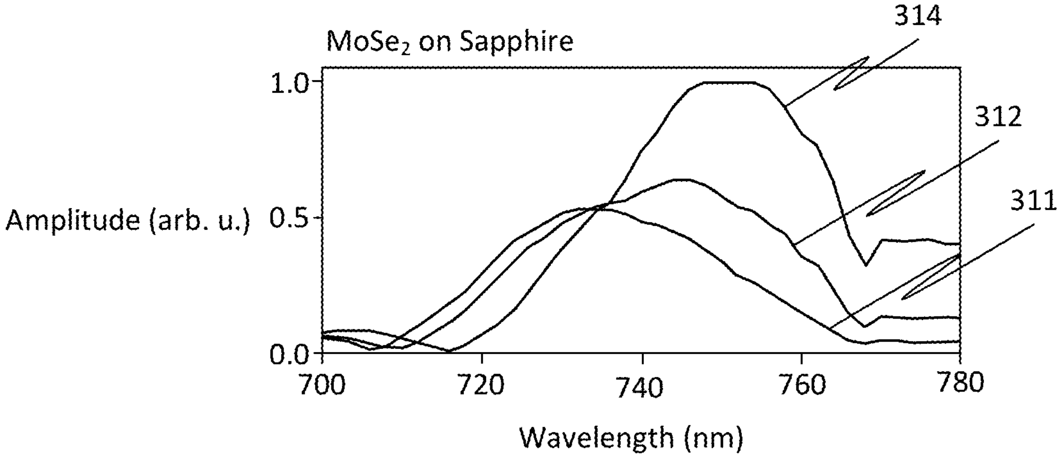
FIG. 3B shows example FWM calibration curves for MoSe2 on Sapphire.

With reference to FIGS. 3A-3B, a FWM spectrum as used herein means a representation of changes of optical intensity or photon energy with respect to changes in a wavelength of the received light and therefore can be visualized in form of a graph. An optical intensity, in this context, may be measured in an arbitrary unit (a.u.), eV (Electron Volts), intensity per unit area, or normalized units used when the intensity values are scaled relative to a maximum or a reference value, often specified by a value between 0 and 1.

With reference to FIGS. 1, 2, and 3A-3B, the FWM spectrum depends on the sample material 140, growth conditions, and the substrate on which the material is grown. Therefore, calibration curves may be determined and stored to convert the FWM spectrums for various thicknesses T. Calibration curves are made by recording FWM spectrum of the same material grown on the same substrate to varying thicknesses. Herein, various example methods for determining the number n of layers L of the sample material 140 are disclosed.

FIG. 3A shows an example set of calibration curves for an example sample material 140 including $MoSe_2$ grown on $SiO_2$ using Metal-Organic Chemical Vapor Deposition (MOCVD). MOCVD is a method used to deposit thin films of compound semiconductors onto substrates. This process is employed in the manufacturing of electronic and optoelectronic devices such as LEDs, laser diodes, and photovoltaic cells. As the material is deposited, the FWM spectrum is periodically measured to track the impact of the growth on the spectrum. With continued reference to FIG. 3A, curves 301, 302, 303 depict measured FWM spectrums for three sample materials 140 having 1 (one), 2, and 3 layers respectively. The curves 301, 302, 303 show changes of FWM spectrum as more layers L of $MoSe_2$ are grown on the substrate $SiO_2$. The measurements may be performed at a plurality of wavelengths and then the curves such as 301, 302, 303 may be generated by drawing lines to interpolate between wavelength points in the spectrum.

Upon measuring a FWM spectrum for a sample material 140 of $MoSe_2$ grown on $SiO_2$ with unknown thickness T, the processor 175 may be programmed to determine thickness T of the sample material 140 by comparing the measured FWM spectrum of the sample material 140 to the calibration curves previously measured for $MoSe_2$ grown on $SiO_2$, e.g., as shown in FIG. 3A.

In comparing the measured FWM spectrum to calibration curves, the processor 175 may be programmed to use various techniques. In one example, the processor 175 may be programmed to compare the measured FWM spectrum to the calibration curves using curve fitting, Euclidean distance, machine learning, etc. For example, in Euclidean distance technique, the processor 175 may be programmed to measure a straight-line distance between corresponding points on two curves: the measured FWM spectrum and each of the calibration curves 301, 302, 303, and determine that the sample material 140 has, e.g., 2 layers, upon determining a Euclidean distance of the measured FWM spectrum to the calibration curve 302 is a minimum compared to the Euclidean distances of the measured FWM spectrum to each of the calibration curves 301, 302, 303.

As shown in example curves 301, 302, 303, integer monolayers have unique FWM spectra. The processor 175 may be programmed to operate based on calibration curves determined based on integer number of layers 1, 2, 3, . . . , n. Intermediate coverages (e.g., 1.4 layers) can then be measured by interpolating between adjacent calibration curves. The processor 175 may be programmed to interpolate between two calibration curves, 301, 302, e.g., when a sample material 140 is 1.4 monolayers thick. The processor 175 may be programmed to determine the thickness T of the sample material 140 by interpolating between the curves 301, 302, e.g., concluding a sum of 60% of the monolayer FWM spectrum of curve 301 and 40% of the bilayer FWM spectrum of curve 302. To interpolate calibration curves various methods may be used. In one example, the spectral resonance is fitted to calculate a peak energy and linewidth. These features can be fitted using a Voigt profile, which considers the Gaussian and Lorentzian contribution to the spectral line shape. From this fit one may determine the center energy of the resonance and the width of the resonance, called the linewidth. For cases in which the center energy or linewidth depends on the monolayer thickness, this number may be used to determine an unknown layer thickness by comparing the unknown spectrum with calibration FWM spectrum.

In another example of comparing FWM spectra of a sample material 140 to calibration curves 301, 302, 303, the processor 175 may be programmed to calculate a spectral peak of the measured FWM spectrum and compare the determined spectral peak to each of the spectral peaks of the calibration curves 301, 302, 303. A spectral peak, in the present context, is a maximum point on an FWM spectrum curve. For example, the thickness T may be determined by calculating a ratio of the spectral intensity at different wavelengths within the same spectrum. Overall intensity fluctuations or scaling differences of spectra cancel out when the ratio of two points in the same spectrum are compared. Therefore, wavelength ratios can be sensitive to thickness-dependent changes in the center energy or linewidth of resonances, and they are robust to daily fluctuations of a device or even comparison of measurements using different devices. For example, an unknown thickness T1 of a first sample material 140 may be determined by comparing a first FWM spectrum of the first sample material 140 to the FWM spectrum of a second sample material 140 with a known thickness T2 made of same material as the first sample material 140.

As discussed above, an FWM spectrum of a sample material 140 not only depends on a number n of layers L but also depends on other factors such as the material included in the sample. FIG. 3B shows a set of calibration curves 311, 312, 314 determined for one layer, two layers, and four layers of $MoSe_2$ on Sapphire. In one example, the processor 175 may be programmed to store a plurality of calibration curves for a plurality of materials, e.g., (i) a set of n calibration curves $M_1C_1$, $M_1C_2$, . . . , $M_1C_n$ corresponding to number of layers from 1 to n for a first material, e.g., $MoSe_2$ on $SiO_2$, (ii) a set of calibration curves $M_2C_1$, $M_2C_2$, . . . , $M_2C_n$ corresponding to number of layers 1 to n for a second material, e.g., $MoSe_2$ on Sapphire, etc. The stored information may be in form of a table such as shown in Table 1.

TABLE 1

| Layers<br>Material | 1 | 2 | 3 | . . . n |
|---|---|---|---|---|
| First Material | M1C1 | M1C2 | M1C3 | . . . M1Cn |
| Second Material | M2C1 | M2C2 | M2C3 | . . . M2Cn |
| . . . | | | | |

The processor 175 may be programmed to determine a number n of layers L of a sample material 140 based on the measured FWM spectrum and the material included in the respective sample material 140. Thus, the processor 175 may be programmed to select the corresponding set of calibration curves based on the information specifying type of material included in the sample material 140.

Additionally, or alternatively, the processor 175 may be programmed to determine a thickness T and/or a number n of layers L in a sample material 140 based on comparing a shape of FWM spectrum to the stored calibration curves. In one example, the processor 175 may be programmed, e.g., based on machine learning techniques, to identify a calibration curve with a shape that is the nearest (most similar) shape to a shape of the measured FWM spectrum and determine the thickness T of the material corresponding to the selected calibration curve.

FIG. 4A shows a Raman intensity diagram for $MoSe_2$ sample material. FIG. 4B shows a PL intensity diagram for $MoSe_2$ sample material. FIGS. 4A-4B are based on those disclosed by Tonndork, P. et al., in Opt. Exp. 21, 4908-4916, 2013. These figures have been adapted to provide additional clarity and context within the scope of the present disclosure.

With respect to FIG. 4A, graphs 410, 420, 430, 440, 450 show signal received based on Raman technique for a one layer, two layer, three layer, four layer and five layer material. Graph 460 shows the signal received for bulk material.

The PL quenching is strong in monolayer semiconductors such as $MoSe_2$ and $WSe_2$ due to a fundamental difference in the semiconductor band structure for the single monolayer material. Here the PL strength from a bilayer sample, as shown in graph 480 is more than 20 times weaker than the strength of a signal from a monolayer in $MoSe_2$, as shown in graph 470. As shown in graph 490, a signal received from a three layer sample is 50 times weaker. PL techniques result in quenching issues and longer acquisition times. When compared to linear absorption spectroscopy, FWM optical spectroscopy reveals the resonance shift with a high signal-to-noise ratio (SNR). Furthermore, unlike PL spectroscopy, the nonlinear optical response is not quenched by the addition of monolayers. Rather, as material is deposited, the center frequency of a FWM spectrum of a material with one to few layers increases continuously. In comparison to PL and Raman intensity techniques, FWM spectroscopy provides a shorter acquisition times and higher sensitivity, thereby FWM spectrum is a more favorable approach. A longer acquisition time poses a problem in industrialization where a reduction of measurement duration is typically preferred. Further, a higher sensitivity provides better discrimination between layer number using FWM spectrum compared to PL and Raman spectra.

Figure 5A:
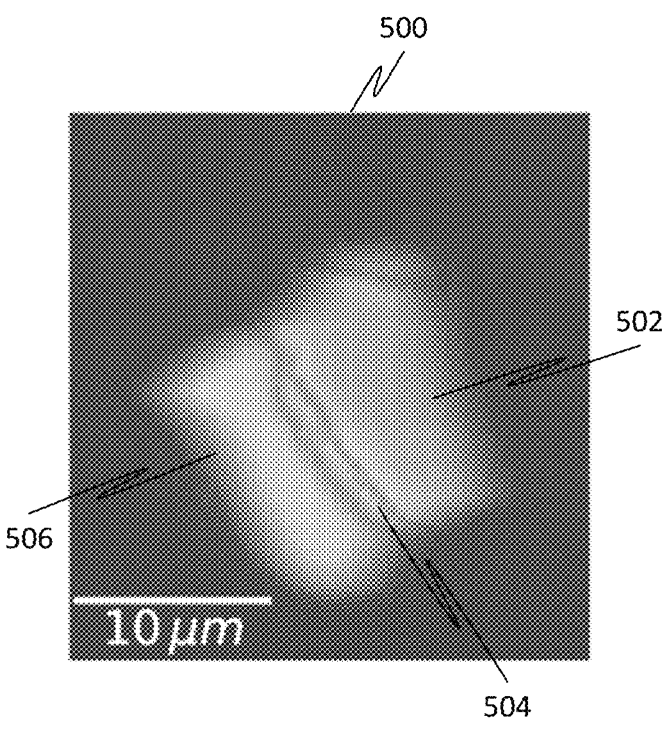
FIGS. 5A-5B show examples of hyperspectral imaging for distinguishing monolayer, bilayer, and tri-layer regions of a sample material using FWM spectrum.
Figure 5B:
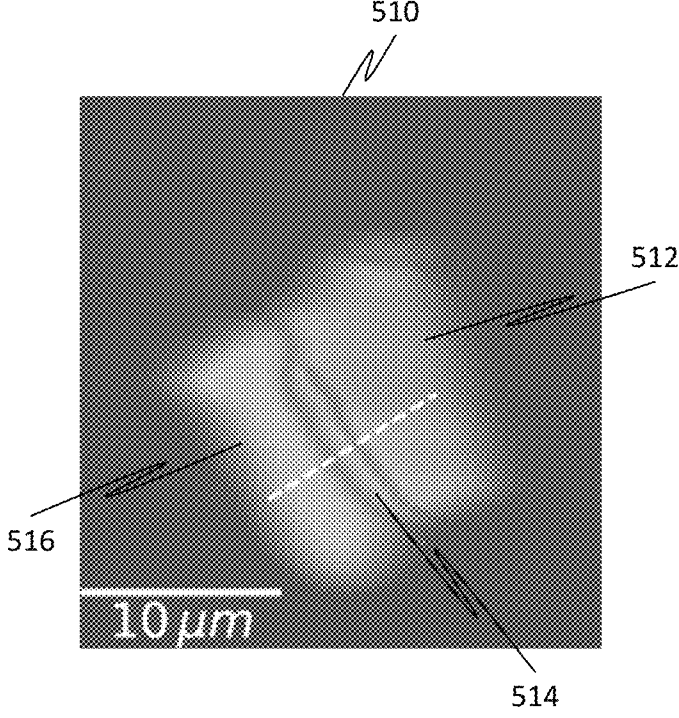

FIG. 5A-5B show hyperspectral images 500, 510 for distinguishing monolayer ML, bilayer BL, and Tri-layer TL regions of a sample material 140 using FWM spectroscopy as the detection mode. With reference to FIG. 5A, regions 502, 504, 506 show the monolayer, bilayer and tri-layer portions of the sample material 140. With reference to FIG. 5B, the regions 512, 514, 516 show the monolayer, bilayer, and tri-layer portions of the material 140. FWM spectroscopy is integrated here with imaging to show the ability of measuring FWM spectra to distinguish layer thickness, even if very few spectral points are considered. In FIG. 5A, images of the various layers are measured for many wavelengths to collect spectra with the same number of wavelength points as those in 3A-B. In FIG. 5B, images of various layers are measured using only 3 wavelength points. The ability to distinguish layers using just 3 points is hardly degraded because the FWM spectral fluctuations with layer thickness are large. Using FWM spectrum techniques an example image 500 may be acquired in less than 3 seconds.

Figure 6:
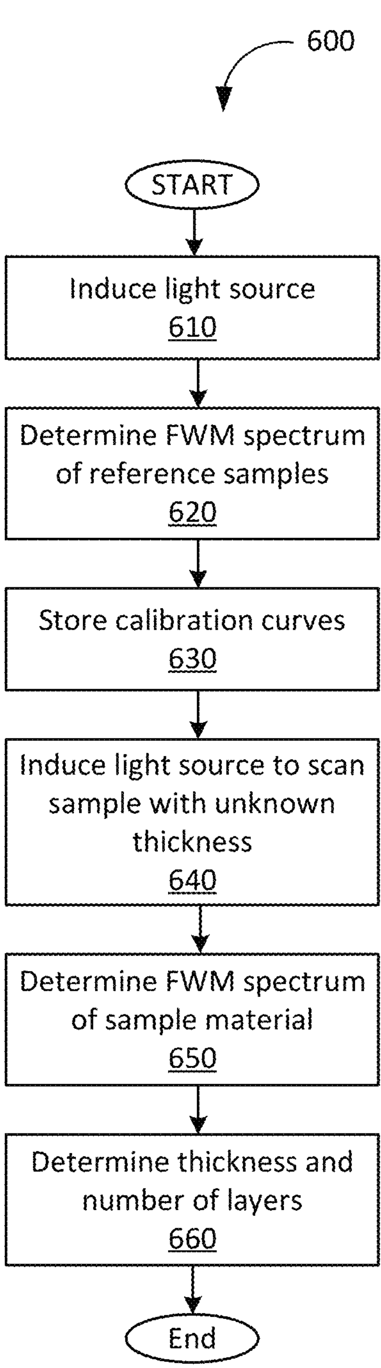
FIG. 6 is a flowchart of an example process for determining thickness of the sample material.

FIG. 6 is a flowchart of an example process 600 to determine a thickness T and a number n of layers L of material in a sample material 140. A processor 175, e.g., in a computing device 170 may be programmed to perform one or more of the blocks of the process 600.

The process 600 begins in a block 610, in which the processor 175 induces the light source 104 to produce a laser light beam to perform a FWM. In one example, the generated light beam is centered at 760 nm and has a 12 nm bandwidth. The center wavelength can be turned to an area with spectral resonance in the material. For example, here, the center wavelength is tuned based on the A-exciton resonance of the material molybdenum diselenide ($MoSe_2$).

Next, in a block 620, the processor 175 calculates the FWM spectrum of multiple sample materials with known thickness T and known number n of layers, referred to as reference material. This step is a repetitional step although not shown, thus performing this step for each of multiple samples.

Next, in a block 630, the processor 175 determines and stores calibration curves based on the measured FWM spectrums. In one example, the processor 175 may store the data in table form, e.g., Table 1, in a memory of the computing device 170.

Next, in a block 640, the processor 175 induces light on a sample material with unknown thickness.

Next, in a block 650, the processor 175 determines the FWM spectrum for the sample material 140 with unknown thickness T.

Next, in a block 660, the processor 175 determines the thickness, expressed as a number n of layers L of the sample material 140. The processor 175 may be programmed to determine the thickness based on the determined FWM spectrum of the sample material 140, the stored calibration curves, e.g., in a table format such as shown in Table 1, and information specifying material composition, e.g., MoSe2 on Sapphire, of the sample material 140. Following the block 660, the process 600 ends or alternatively returns to the block 610.

What is claimed is:

1. A system, comprising:

a single laser output used as an excitation source;

an optical spectroscopy system configured to perform four-wave mixing (FWM) spectroscopy, and a computer, the computer comprising a processor programmed to:

measure, via nonlinear optical spectroscopy, a FWM spectrum of a sample material as a function of two or more wavelengths;

use the FWM spectrum to determine a thickness of the sample material, wherein the thickness is thickness is a number of layers in the sample material.

2. The system of claim 1, wherein the thickness determination is made by determining ratios of the FWM spectrum at different wavelengths.

3. The system of claim 1, wherein the thickness determination includes comparing the FWM spectrum of a sample material with an unknown thickness to FWM spectrum of samples made of a same material with known thicknesses.

4. The system of claim 3, wherein the known thicknesses are an integer number of layers of atoms.

5. The system of claim 1, wherein the thickness determination is made by calculating a spectral peak of four-wave mixing spectrum.

6. The system of claim 1, wherein the FWM spectrum is induced by two excitation beams, the excitation beams are each amplitude modulated with two different frequencies ($f_1$ and $f_2$), the FWM spectrum is measured on a photodetector by lock-in detection at a difference ($f_1-f_2$) or a sum ($f_1+f_2$) frequency, of each of the two excitation beams.

7. The system of claim 1, wherein the layers of the sample material are a transition metal dichalcogenide.

8. The system of claim 7, wherein the transition metal dichalcogenide is $MoS_2$ or $WSe_2$.

9. A system, comprising:

an optical spectroscopy system comprising a single laser output used as an excitation source and modulators configured to perform four-wave mixing (FWM) spectroscopy, wherein the FWM spectrum is induced by two or more excitation beams, the modulators apply two different frequencies (f1 and f2) to the excitation beams, and the FWM spectrum is measured on a photodetector by lock-in detection at a difference (f1−f2) or a sum (f1+f2) frequency; and a computer, the computer comprising a processor programmed to:

measure, via nonlinear optical spectroscopy, a FWM spectrum of a sample material as a function of two or more wavelengths;

use the FWM spectrum to determine a thickness of the sample material, wherein the thickness is a number of layers in the sample material.

10. The system of claim 9, wherein the thickness determination is made by determining ratios of the FWM spectrum at different wavelengths.

11. The system of claim 9, wherein the thickness determination includes comparing the FWM spectrum of a sample material with an unknown thickness to FWM spectrum of samples made of a same material with known thicknesses.

12. The system of claim 11, wherein the known thicknesses are an integer number of layers of atoms.

13. The system of claim 9, wherein the thickness determination is made by calculating a spectral peak of four-wave mixing spectrum.

14. The system of claim 9, wherein the layers of the sample material are a transition metal dichalcogenide.

15. The system of claim 14, wherein the transition metal dichalcogenide is $MoS_2$ or $WSe_2$.

16. A method for determining a number of layers of a sample material, comprising:

directing a single laser output as an excitation source toward the sample material;

measuring, via nonlinear optical spectroscopy, a four-wave mixing (FWM) spectrum of the sample material as a function of two or more wavelengths; and using the FWM spectrum to determine a thickness of the sample material, wherein the thickness is a number of layers in the sample material.

17. A method for determining a number of layers of a sample material, comprising:

modulating two or more excitation beams with two different frequencies (f1 and f2) using modulators configured to perform four-wave mixing (FWM) spectroscopy;

directing the modulated excitation beams toward the sample material to induce a FWM spectrum;

measuring the FWM spectrum on a photodetector by lock-in detection at a difference (f1−f2) or a sum (f1+f2) frequency;

measuring, via nonlinear optical spectroscopy, the FWM spectrum of the sample material as a function of two or more wavelengths; and using the FWM spectrum to determine a thickness of the sample material, wherein the thickness is a number of layers in the sample material;

wherein a single laser output is used as an excitation source.

* * * * *